United States Patent [19]
Young

[11] Patent Number: 5,340,206
[45] Date of Patent: Aug. 23, 1994

[54] PLASTIC WHEEL

[76] Inventor: James R. Young, 2321 E. Gore Rd., Erie, Pa. 16510

[21] Appl. No.: 836,548

[22] Filed: Feb. 18, 1992

Related U.S. Application Data

[63] Continuation-in-part of Ser. No. 609,729, Nov. 6, 1990, abandoned.

[51] Int. Cl.⁵ .................................................. B60B 5/00
[52] U.S. Cl. ................................. 305/24; 301/111; 301/64.7
[58] Field of Search ................. 301/5.7, 111, 112, 122, 301/64.7; 305/21, 22, 24, 35 R, 35 EB, 38, 39, 56, 57, 28

[56] References Cited

U.S. PATENT DOCUMENTS

| | | | |
|---|---|---|---|
| 2,497,224 | 2/1950 | Laure | 301/63 PW X |
| 2,622,930 | 12/1952 | Negri | 301/5.7 |
| 3,576,352 | 4/1971 | Sato | 305/35 EB |
| 3,666,323 | 5/1972 | Beaudoin et al. | 152/379.3 X |
| 3,895,844 | 7/1975 | Merbler | 301/5.7 |
| 4,217,006 | 8/1980 | Dehnert | 305/38 X |
| 4,409,386 | 10/1983 | Yasui et al. | 305/24 X |
| 4,531,785 | 7/1985 | Perkins | 301/5.7 |
| 4,565,412 | 1/1986 | Comminge et al. | 305/56 X |
| 4,674,759 | 6/1987 | Parker | 301/63 PW X |
| 4,687,261 | 8/1987 | Atkin | 305/38 X |
| 4,802,519 | 2/1989 | Moranz | 152/326 X |

FOREIGN PATENT DOCUMENTS 0039838  3/1980  Japan ..................... 305/56

*Primary Examiner*—Russell D. Stormer

[57] ABSTRACT

A snowmobile having a frame, a track, a drive for the track and idler wheels supporting the track. The drive wheels each being molded from a single piece of thermoplastic material and have hub openings and inclined track engaging surfaces molded in place.

2 Claims, 2 Drawing Sheets

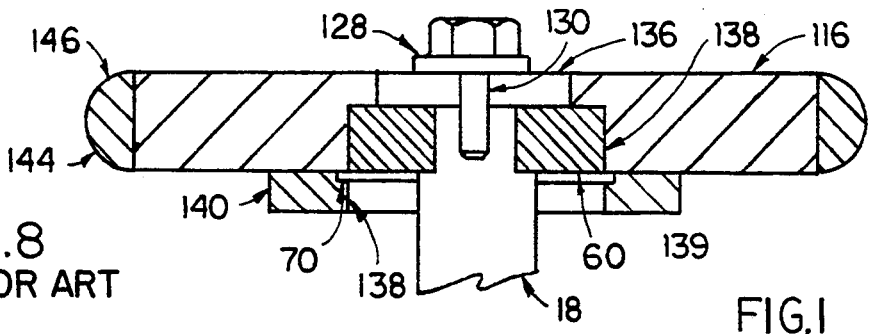
FIG. 8 PRIOR ART
FIG. 1
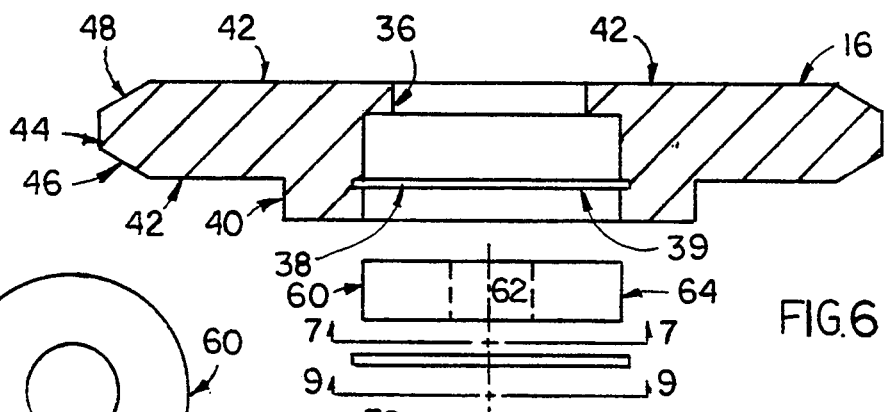
FIG. 6
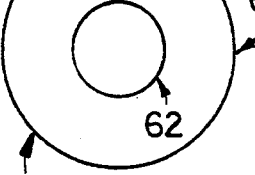
FIG. 7
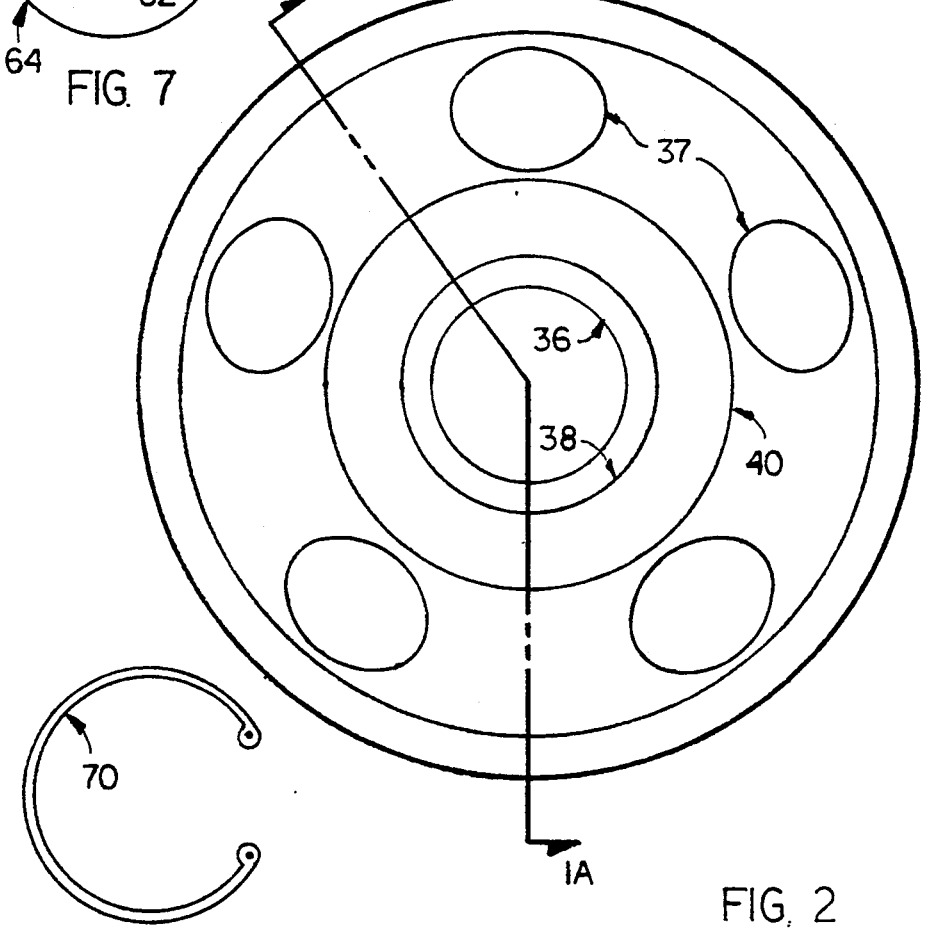
FIG. 2
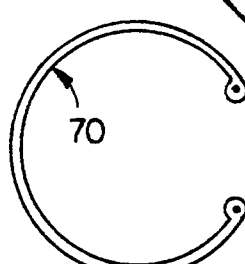
FIG. 9

PLASTIC WHEEL

This application is a continuation-in-part of application Ser. No. 07/609,729, filed Nov. 6, 1990 now abandoned.

BACKGROUND OF THE INVENTION

This invention relates to snowmobiles which has a track, a drive wheel and two or more idler wheels supported on the snowmobile frame which engage the track of the snowmobile.

Snowmobile wheels such as for example, sold by the Yamaha Company have idler or bogie wheels made of metal extending outwardly to a tire receiving rim. This rim receives a tire which is usually made of rubber, or a similar material that is subject to clipping, cracking and otherwise destruction due to the severe conditions such wheels encounter in service. Such wheels often fail after a relatively few hours service.

SUMMARY OF THE INVENTION

It has been discovered that wheels for snowmobiles can be made of single integral piece of a light impact molded thermoplastic of the type having the properties of nylon, polyethylene, polystyrene or vinyl which will last several times as long as the presently used metal wheels with rubber tires.

It is an object of the invention to provide an improved snowmobile wheel.

Another object of the invention is to provide a snowmobile wheel that is simple in construction, economical to manufacture and simple and efficient to make.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING

FIG. 1 is a cross sectional view taken on line 1—1 of FIG. 2.

FIG. 2 is an enlarged side view of a snowmobile wheel according to the invention.

FIG. 6 is an exploded view of the bearing and snap ring that fit into the idler wheel as shown in FIG. 1.

FIG. 7 is a top view of the bearing shown in FIG. 6.

FIG. 8 is an exploded view of a prior art wheel.

FIG. 9 is a top view of a snap ring.

DETAILED DESCRIPTION OF THE DRAWING

Figure 3:
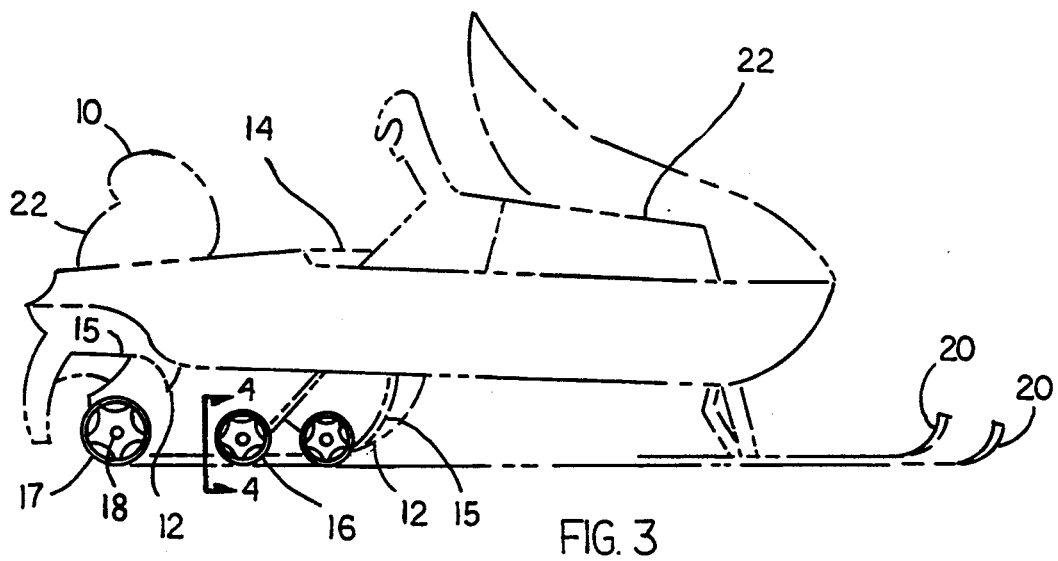
FIG. 3 is as side view of a snowmobile having idler wheels according to the invention.
Figure 4:
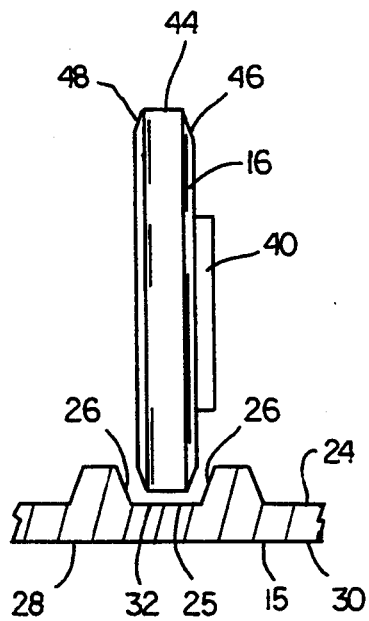
FIG. 4 is a cross sectional view taken on line 4—4 of FIG. 3.
Figure 5:
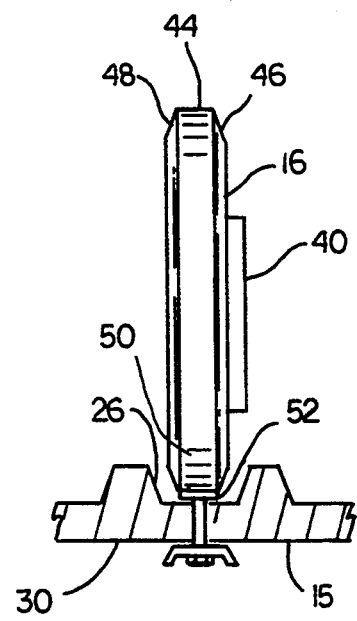
FIG. 5 is a view similar to FIG. 4 of another embodiment of a track.

Now with more particular reference to the drawing, idler wheels 116 according to the prior art are shown in FIG. 8. Idler wheels 116 are supported on bearings 60 which receive axles 18. Idler wheels 116 are held to axle 18 by screw 128 in threaded opening 130. Idler wheels 116 can be used on the snowmobile as shown in FIG. 3, having frame 12 at each side of snowmobile 10 to carry continuous track 15. Each of idler wheels 116 has an outwardly extending flange 140 concentric to axles 18. Idler wheels 116 are made of steel and have central bore 136, counterbore 138 which has internal groove 139, a rubber tire 146 having outside peripheral surface 144 is supported on idler wheels 116. Rubber tire 146 engages outwardly inclined side surface 26 of continuous track 15. FIG. 3 shows snowmobile 10 having frame 12, seat 14, continuous track 15, idler wheels 16, drive wheels 17, skis 20 and a drive means in the form of engine 22.

Continuous track 15 has flat outside surface 28 for engaging snow and central V-shaped groove 25 in the inner surface thereof. Central V-shaped groove 25 is defined by flat bottom internal surface 32 and outwardly inclined side surfaces 26. Central V-shaped groove 25 and external ground engaging surface 30 in continuous track 15 receives outside peripheral surface 44 of idler wheels 16.

Bearing 60 has bore 62 and outer periphery 64. Bearing 60 fits into counterbore 38 or counterbore 138 and snap ring 70 snaps into internal groove 39 in wheel 16 for holding bearing 60 in place in counterbore 38. Bearing 60 and snap ring 70 make up a bearing assembly. Axles 18 on snowmobile 10 are received in bore 62 in bearing 60. Bearing 60 and snap ring 70 are of a type familiar to those skilled in the art.

Idler wheels 16 are supported on bearings 60 which receive axles 18 of frame 12 at each side of snowmobile 10 to carry continuous track 15. Idler wheels 16 each have outwardly extending flange 40 concentric to hubs 18. Idler wheels 16 are molded from a single integral piece of thermoplastic material and have central bore 36, openings 37 to save weight and material, counterbore 38 which has internal groove 39, outside peripheral surface 44, first inclined side 46 and second inclined side 48. First inclined side 46 of idler wheels 18 extends radially inwardly from side surfaces 42 of idler wheels 16 and terminate at outside peripheral surface 44. First inclined side 46 and second inclined side 48 are frictional surfaces which engage outwardly inclined side surface 26 of continuous track 15.

Idler wheels 16 have notches 50 formed in outside peripheral surface 44. Notches 50 are engaged by spaced cleats 52 formed in the outer periphery of idler wheels 16 which are supported on continuous track 15. Spaced cleats 52 are received in notches 50 on continuous track 15 to give positive traction.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

What is claimed is:

1. In combination a snowmobile and idler wheels;
   said snowmobile having a continuous track;
   said idler wheels supporting said continuous track on said snowmobile;
   drive means on said snowmobile connected to said continuous track;
   said continuous track having an external ground engaging surface and a flat bottom internal surface with a central V-shaped groove extending continuously around said continuous track;

said idler wheels having a continuous outside peripheral surface received in said central V-shaped groove and a central bore;

said central bore being adapted to receive an axle of said snowmobile;

each said idler wheel comprising a single integral piece of thermoplastic material having said outside peripheral surface, a first inclined side and a second inclined side;

said first inclined side and said second inclined side extending from said outside peripheral surface inwardly toward said central bore defining a V-shaped rim adjacent said outside peripheral surface;

said V-shaped rim being received in said central V-shaped groove;

said central bore having a counterbore terminating at an inwardly extending flange for receiving a bearing assembly;

said flange terminates at said central bore to retain a bearing assembly whereby said idler wheels can be positively supported on said bearing assembly for rotation thereon;

an annular internal groove extending outwardly radially from said counterbore adjacent side surfaces of said idler wheels to receive a retaining ring; and, said idler wheels having notches formed in the sides thereof to save material, reduce weight and thereby reduce cost.

2. The combination recited in claim 1 wherein said idler wheels have a plurality of notches in the periphery of said idler wheels for engaging spaced cleats on said track.

* * * * *